United States Patent
Okaya et al.

(10) Patent No.: US 11,964,745 B2
(45) Date of Patent: Apr. 23, 2024

(54) UNDERWATER WORK SYSTEM

(71) Applicant: KAWASAKI JUKOGYO KABUSHIKI KAISHA, Kobe (JP)

(72) Inventors: Noriyuki Okaya, Kobe (JP); Koichi Fukui, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 194 days.

(21) Appl. No.: 17/590,201

(22) Filed: Feb. 1, 2022

(65) Prior Publication Data
US 2022/0153396 A1 May 19, 2022

Related U.S. Application Data

(63) Continuation of application No. PCT/JP2020/029014, filed on Jul. 29, 2020.

(30) Foreign Application Priority Data

Aug. 9, 2019 (JP) .................. 2019-147156

(51) Int. Cl.
*G01S 15/74* (2006.01)
*B63G 8/00* (2006.01)
*B63G 8/39* (2006.01)

(52) U.S. Cl.
CPC .............. *B63G 8/39* (2013.01); *B63G 8/001* (2013.01); *G01S 15/74* (2013.01)

(58) Field of Classification Search
CPC .......... G01S 17/74; G01S 17/02; G01S 15/02; G01S 15/50; G01S 15/52; G01S 15/523;
(Continued)

(56) References Cited

U.S. PATENT DOCUMENTS

| 5,844,159 A | 12/1998 | Posseme et al. |
| 7,362,653 B2 * | 4/2008 | Green ............. G01S 15/74 367/134 |

(Continued)

FOREIGN PATENT DOCUMENTS

| JP | H03-139494 A | 6/1991 |
| JP | 2013-67358 A | 4/2013 |

(Continued)

*Primary Examiner* — Daniel L Murphy
*Assistant Examiner* — Amie M Ndure
(74) *Attorney, Agent, or Firm* — Oliff PLC

(57) ABSTRACT

An underwater work system of the present disclosure acquires a relative position of an underwater vehicle relative to a surface ship at the start of searching work, the relative position being measured based on a sound wave transmitted from a wave transmitter. The underwater work system calculates a position of the underwater vehicle based on the acquired relative position. When a measurement error region whose center corresponds to the calculated position of the underwater vehicle and an expected laid region of a pipeline extending in a predetermined direction overlap each other, the underwater work system moves the underwater vehicle to such a position that the measurement error region and the expected laid region do not overlap each other, and then, makes the underwater vehicle perform crossing detection in which the underwater vehicle detects the presence or absence of the pipeline while crossing the expected laid region.

7 Claims, 7 Drawing Sheets

(58) Field of Classification Search
CPC ...... G01S 15/526; G01S 15/58; G01S 15/586;
G01S 15/582; G01S 15/588; G01S 15/60;
G01S 15/62; B63B 22/16; B63B 22/003;
B63B 22/02; B63B 21/28; B63B 22/06;
B63B 3/13; B63B 45/08; B63B 51/00;
B63B 35/00; B63B 2035/006; B63G
8/39; B63G 8/001; B63G 2008/002;
B63G 8/00; B63G 8/42; B63C 11/48
USPC ...................... 367/2, 118, 124, 127, 134, 131
See application file for complete search history.

(56) References Cited

U.S. PATENT DOCUMENTS

| | | | | |
|---|---|---|---|---|
| 2003/0078706 | A1* | 4/2003 | Larsen | G01C 21/1652 |
| | | | | 701/494 |
| 2006/0235583 | A1* | 10/2006 | Larsen | G01S 5/18 |
| | | | | 701/408 |
| 2007/0025185 | A1* | 2/2007 | Green | G01S 3/808 |
| | | | | 367/124 |
| 2008/0037370 | A1* | 2/2008 | Crowell | H04B 11/00 |
| | | | | 367/127 |
| 2012/0243375 | A1* | 9/2012 | Melvin, II | G01S 15/876 |
| | | | | 367/118 |
| 2014/0165898 | A1 | 6/2014 | Cierpka et al. | |
| 2014/0230713 | A1* | 8/2014 | Kimura | B63C 11/48 |
| | | | | 114/313 |
| 2016/0272291 | A1 | 9/2016 | Outa et al. | |

FOREIGN PATENT DOCUMENTS

| | | |
|---|---|---|
| JP | 5806568 B2 | 11/2015 |
| JP | 2016-526148 A | 9/2016 |
| JP | 2018-514433 A | 6/2018 |
| WO | 2014/165781 A1 | 10/2014 |
| WO | 2016/149199 A1 | 9/2016 |

* cited by examiner

UNDERWATER WORK SYSTEM

CROSS-REFERENCE TO RELATED APPLICATION

The present application is a bypass continuation of PCT Filing PCT/JP2020/029014, filed Jul. 29, 2020, which claims priority to JP 2019-147156, filed Aug. 9, 2019, both of which are incorporated by reference in their entirety

BACKGROUND OF THE INVENTION

1. Field of the Invention

The present disclosure relates to an underwater work system that performs work in water by using an underwater vehicle.

2. Description of the Related Art

In recent years, work for pipelines laid on the bottom of water is performed by using an unmanned underwater vehicle (see Japanese Laid-Open Patent Application Publication No. 2013-67358, for example). Therefore, if the underwater vehicle can also perform searching work of finding the pipelines in advance, efficiency improves.

SUMMARY OF THE INVENTION

An underwater work system of the present disclosure includes: a surface ship located on water; an underwater vehicle that performs searching work of finding a pipeline laid on a bottom of the water; a wave transmitter that is mounted on the surface ship and transmits a sound wave used to measure a relative position of the underwater vehicle relative to the surface ship; and circuitry configured to acquire the relative position of the underwater vehicle relative to the surface ship at the start of the searching work, the relative position being measured based on the sound wave transmitted from the wave transmitter, calculate a position of the underwater vehicle based on the acquired relative position, and when a measurement error region whose center corresponds to the calculated position of the underwater vehicle and an expected laid region of the pipeline extending in a predetermined direction overlap each other, move the underwater vehicle to such a position that the measurement error region and the expected laid region do not overlap each other, and then, make the underwater vehicle perform crossing detection in which the underwater vehicle detects the presence or absence of the pipeline while crossing the expected laid region.

Moreover, an underwater work system of the present disclosure includes: a surface ship located on water; an underwater vehicle that performs searching work of finding a pipeline laid on a bottom of the water; a wave transmitter that is mounted on the surface ship and transmits a sound wave used to measure a relative position of the underwater vehicle relative to the surface ship; and circuitry configured to acquire the relative position of the underwater vehicle relative to the surface ship at the start of the searching work, the relative position being measured based on the sound wave transmitted from the wave transmitter, calculate a position of the underwater vehicle based on the acquired relative position, and when an interval between a measurement error region whose center corresponds to the calculated position of the underwater vehicle and an expected laid region of the pipeline extending in a predetermined direction is not a predetermined distance, move the underwater vehicle to such a position that the interval between the measurement error region and the expected laid region becomes the predetermined distance, and then, make the underwater vehicle perform crossing detection in which the underwater vehicle detects the presence or absence of the pipeline while crossing the expected laid region.

Moreover, an underwater work system of the present disclosure includes: a surface ship located on water; an underwater vehicle that performs searching work of finding a pipeline laid on a bottom of the water; a wave transmitter that is mounted on the surface ship and transmits a sound wave used to measure a relative position of the underwater vehicle relative to the surface ship; and circuitry configured to in the searching work, acquire the relative position of the underwater vehicle relative to the surface ship while making the underwater vehicle perform crossing detection in which the underwater vehicle detects the pipeline while crossing an expected laid region of the pipeline extending in a predetermined direction, the relative position being measured based on the sound wave transmitted from the wave transmitter, calculate a position of the underwater vehicle based on the acquired relative position, and when the pipeline is not detected although the underwater vehicle moves to such a position that a measurement error region whose center corresponds to the calculated position of the underwater vehicle and the expected laid region do not overlap each other, change a proceeding direction of the underwater vehicle and make the underwater vehicle perform the crossing detection again.

Moreover, an underwater work system according to another aspect of the present disclosure includes: a surface ship located on water; a transponder dropped from the surface ship to a bottom of the water; and an underwater vehicle that performs searching work of finding a pipeline laid on the bottom of the water based on the dropped transponder.

DESCRIPTION OF THE PREFERRED EMBODIMENTS

Embodiment 1

Figure 1:
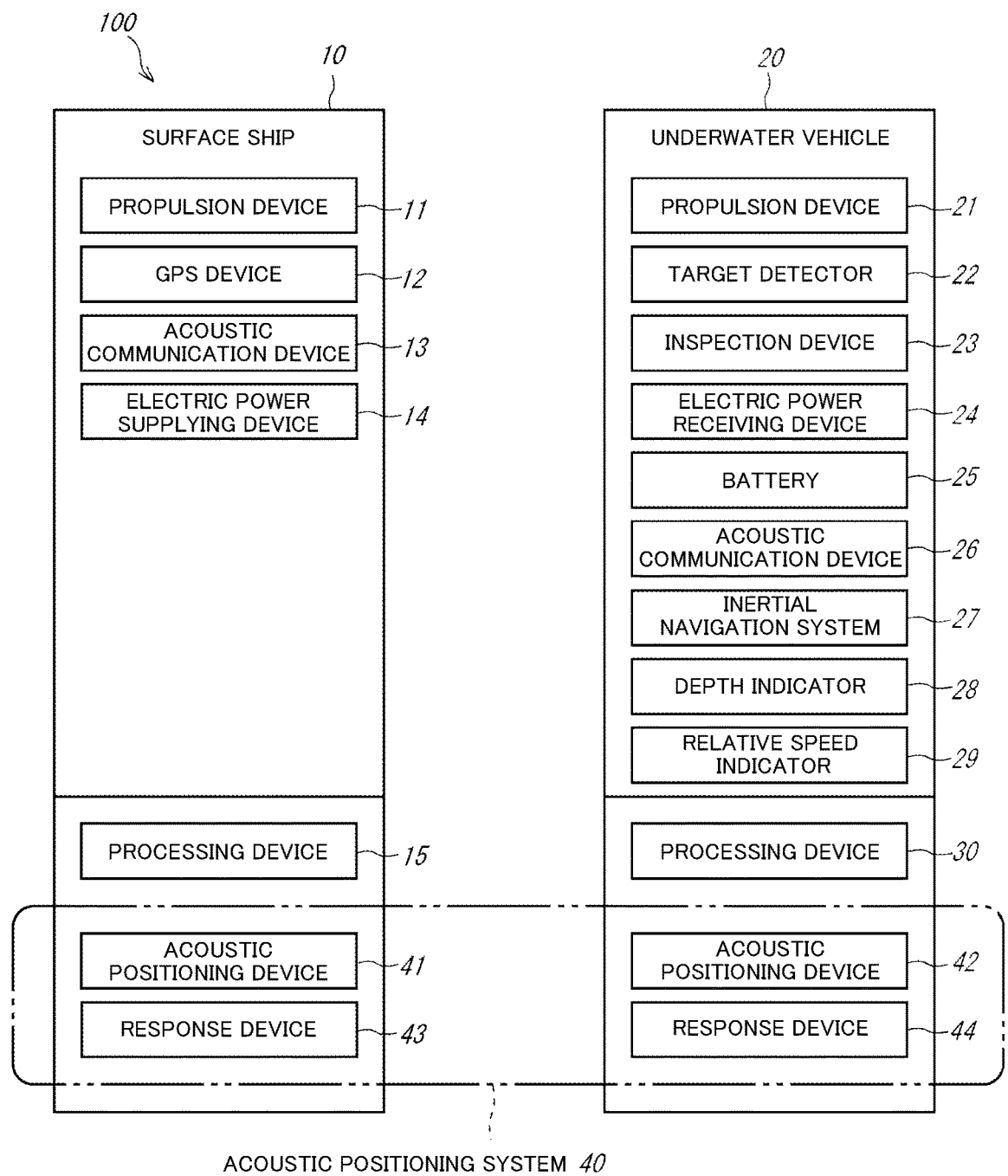
FIG. 1 is a block diagram of an underwater work system according to Embodiment 1.

The following will describe an underwater work system 100 according to Embodiment 1 of the present disclosure. First, an entire configuration of the underwater work system 100 will be described. According to the underwater work system 100 of the present embodiment, the search of a pipeline laid on the bottom of water is executed by using an underwater vehicle 20 before performing work, such as the inspection of the pipeline. FIG. 1 is a block diagram of the underwater work system 100 according to the present embodiment. As shown in FIG. 1, the underwater work system 100 includes a surface ship 10, the underwater vehicle 20, and an acoustic positioning system 40. The term "position" simply described below denotes an absolute position (position on a geographic coordinate system).

Surface Ship

The surface ship 10 is a surface support ship that sails on the water and supports the underwater vehicle 20. For example, the surface ship 10 supplies electric power to the underwater vehicle 20 and stores data acquired by the underwater vehicle 20. The surface ship 10 includes a propulsion device 11, a GPS (Global Positioning System) device 12, an acoustic communication device 13, and an electric power supplying device 14. Moreover, a processing device 15 is disposed at the surface ship 10.

The propulsion device 11 is a device that generates thrust by which the surface ship 10 sails on the water. The GPS device 12 is a device that acquires positional information of the surface ship 10 on the water. The acoustic communication device 13 is a device that communicates with a below-described acoustic communication device 26 of the underwater vehicle 20 by using sound. By the acoustic communication device 13, information (for example, the remaining amount of a battery 25 of the underwater vehicle 20) acquired by the respective devices of the underwater vehicle 20 can be acquired from the underwater vehicle 20.

The electric power supplying device 14 is a device that supplies electric power to a below-described electric power receiving device 24 of the underwater vehicle 20. In the present embodiment, the underwater vehicle 20 approaches the surface ship 10, and electric power is supplied from the electric power supplying device 14 of the surface ship 10 to the electric power receiving device 24 of the underwater vehicle 20. The electric power supplying device 14 may be a noncontact electric power supplying device that supplies electric power to the electric power receiving device 24 in a noncontact manner or may be a contact electric power supplying device that supplies electric power through, for example, a connector connecting the surface ship 10 and the underwater vehicle 20. In the present embodiment, the underwater vehicle 20 is charged by the surface ship 10. However, a floating body on the water or a charging station on the bottom of the sea may have, for example, a charging function of the surface ship 10, and the underwater vehicle 20 may be charged by the floating body or the charging station.

The processing device 15 is a device that performs various types of processing, i.e., for example, controls the entire surface ship 10. The processing device 15 includes a processor, a volatile memory, a non-volatile memory, an SSD, an I/O interface, and the like. The SSD stores various control programs, such as a below-described searching program, and various pieces of data. After the non-volatile memory downloads various control programs from the SSD, the processor performs calculation processing based on the control programs by using the volatile memory. Moreover, the processing device 15 is electrically connected to the respective devices of the surface ship 10. The processing device 15 acquires various pieces of information based on measurement signals transmitted from the devices, performs calculation based on the information, and transmits control signals to the respective devices.

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

Underwater Vehicle

The underwater vehicle 20 is an autonomous underwater vehicle that can sail independently from the surface ship 10 and can perform work in the water. The underwater vehicle 20 includes a propulsion device 21, a target detector 22, an inspection device 23, the electric power receiving device 24, the battery 25, the acoustic communication device 26, an inertial navigation system 27, a depth indicator 28, and a relative speed indicator 29. Moreover, the underwater vehicle 20 includes a processing device 30.

The propulsion device 21 is a device that generates thrust by which the underwater vehicle 20 sails in the water. The propulsion device 21 includes propulsion units and a rudder device that changes a route of the underwater vehicle 20. Examples of the propulsion units include: a main propulsion thruster that moves the underwater vehicle 20 forward; a vertical thruster that moves the underwater vehicle 20 in an upper-lower direction; and a horizontal thruster that moves the underwater vehicle 20 in a left-right direction. However, the propulsion device 21 is not limited to this and may include, for example, a swing thruster that can change a direction of the generation of the thrust.

The target detector 22 is a device that detects a pipeline that is a work target. The target detector 22 of the present embodiment is a so-called multibeam sonar. The target detector 22 may be a shape recognition laser or may include both the multibeam sonar and the shape recognition laser. Moreover, the position of the target detector 12 and the number of target detectors 12 are not especially limited.

The inspection device 23 is a device that inspects the pipeline. The inspection device 23 of the present embodiment is an imaging camera (for example, a TV camera) that takes an image of the pipeline. Instead of or in addition to the imaging camera, the inspection device 23 may include one or both of, for example, an anticorrosion inspection unit that detects the degree of deterioration of an anticorrosion treatment (for example, anticorrosion coating) over the entire length of the pipeline and a thickness inspection unit that detects a thickness of the pipeline in order to detect the degree of corrosion and the presence or absence of damage.

The electric power receiving device 24 is a device that receives electric power supplied from the electric power supplying device 14 included in the surface ship 10. The battery 25 is charged based on the electric power received by the electric power receiving device 24. The electric power stored in the battery 25 is used for the operations of the respective devices, such as the propulsion device 21, included in the underwater vehicle 20.

The acoustic communication device 26 is a device that communicates by sound with the acoustic communication device 13 included in the surface ship 10. Information (for example, the remaining amount of the battery 25) acquired by the devices included in the underwater vehicle 20 can be transmitted from the underwater vehicle 20 to the surface ship 10 by the acoustic communication device 26.

The inertial navigation system (INS) 27 is a device that measures the direction, position, and speed of the underwater vehicle 20 in an absolute coordinate system by using an acceleration sensor and a gyro sensor. The depth indicator 28 is a device that measures the depth of the underwater vehicle 20. The relative speed indicator 29 is a device that measures a relative movement direction and relative speed of the underwater vehicle 20 based on fixed objects, such as the bottom of the water and the pipeline, by utilizing the Doppler effect.

The processing device 30 includes a processor, a volatile memory, a non-volatile memory, an SSD, an I/O interface, and the like. The processing device 30 is electrically connected to the above-described devices of the underwater vehicle 20. The processing device 30 acquires various pieces of information based on measurement signals transmitted from the devices of the underwater vehicle 20. Then, the processing device 30 performs calculation based on the information and transmits control signals to the devices of the underwater vehicle 20.

Acoustic Positioning System

The acoustic positioning system 40 is a system that measures the position of the underwater vehicle 20 relative to the surface ship 10 and the position of the surface ship 10 relative to the underwater vehicle 20. The acoustic positioning system 40 of the present embodiment includes: acoustic positioning devices 41 and 42 respectively disposed at the surface ship 10 and the underwater vehicle 20; and response devices 43 and 44 respectively disposed at the surface ship 10 and the underwater vehicle 20. The acoustic positioning device 41 of the surface ship 10 may be integrated with the acoustic communication device 13 of the surface ship 10. Moreover, the acoustic positioning device 42 of the underwater vehicle 20 may be integrated with the acoustic communication device 26 of the underwater vehicle 20.

When a sound wave is transmitted from the acoustic positioning device 41 of the surface ship 10 to the response device 44 of the underwater vehicle 20, the response device 44 that has detected the sound wave transmits response wave (response signal) to the acoustic positioning device 41. The acoustic positioning device 41 can measure the relative position of the underwater vehicle 20 relative to the surface ship 10 based on the response wave from the response device 44. Moreover, the processing device 15 of the surface ship 10 can acquire the relative position of the underwater vehicle 20 relative to the surface ship 10 from the acoustic positioning device 41 and can calculate the position (apparent absolute position) of the underwater vehicle 20 based on the relative position and positional information of the surface ship 10 acquired from the GPS device 12. Since an error occurs in the measurement of the acoustic positioning device 41, the calculated position of the underwater vehicle 20 is only the apparent absolute position and is utilized for the setting of a below-described measurement error region.

Moreover, when the sound wave is transmitted from the acoustic positioning device 42 of the underwater vehicle 20 to the response device 43 of the surface ship 10, the response device 43 that has detected the sound wave transmits the response wave (response signal) to the acoustic positioning device 42. The acoustic positioning device 42 can measure the relative position of the surface ship 10 relative to the underwater vehicle 20 based on the response wave from the response device 43. When the underwater vehicle 20 returns to the surface ship 10 to, for example, be charged, the processing device 30 of the underwater vehicle 20 acquires the relative position of the surface ship 10 relative to the underwater vehicle 20 from the acoustic positioning device 42 and drives the propulsion device 21 based on the relative position and the information acquired from the acoustic positioning device 42 such that the underwater vehicle 20 approaches the surface ship 10.

The acoustic positioning system 40 of the present embodiment is an USBL (Ultra Short Base Line) positioning system. To be specific, each of the acoustic positioning devices 41 and 42 includes a wave transmitter and a wave receiving array. The wave transmitter transmits the sound wave, and the wave receiving array receives the response wave transmitted from the response device 43, 44 that has detected the sound wave. Each of the acoustic positioning devices 41 and 42 calculates a distance to the response device 43, 44 from a round trip time of the sound wave between the acoustic positioning device 41, 42 and the response device 43, 44 and specifies the direction of the response device 43, 44 based on a phase difference of the response waves which have reached respective elements of the wave receiving array.

The acoustic positioning system 40 is not limited to the USBL positioning system. For example, the acoustic positioning system 40 may be an SBL (Short Base Line) system in which: regarding the acoustic positioning devices 41 and 42, three or more wave receivers are provided at each of the surface ship 10 and the underwater vehicle 20 so as to be spaced apart from each other; and the direction of the response device 43, 44 relative to the acoustic positioning device 41, 42 is specified based on a difference of arrival times of the response waves received by the wave receivers.

Searching Work of Pipeline

Next, searching work of finding the pipeline laid on the bottom of the water will be described. The searching work of the pipeline is performed before performing, for example, the inspection of the pipeline. The processing device 15 of the surface ship 10 acquires various pieces of information from the processing device 30 of the underwater vehicle 20 through the acoustic communication devices 13 and 26 and executes the searching program based on the information. The processing device 15 of the surface ship 10 performs various calculation processing in the searching program and transmits a control signal to the processing device 30 of the underwater vehicle 20 through the acoustic communication devices 13 and 26. The processing device 30 of the underwater vehicle 20 controls the propulsion device 21 and the like based on the received control signal.

Figure 2:
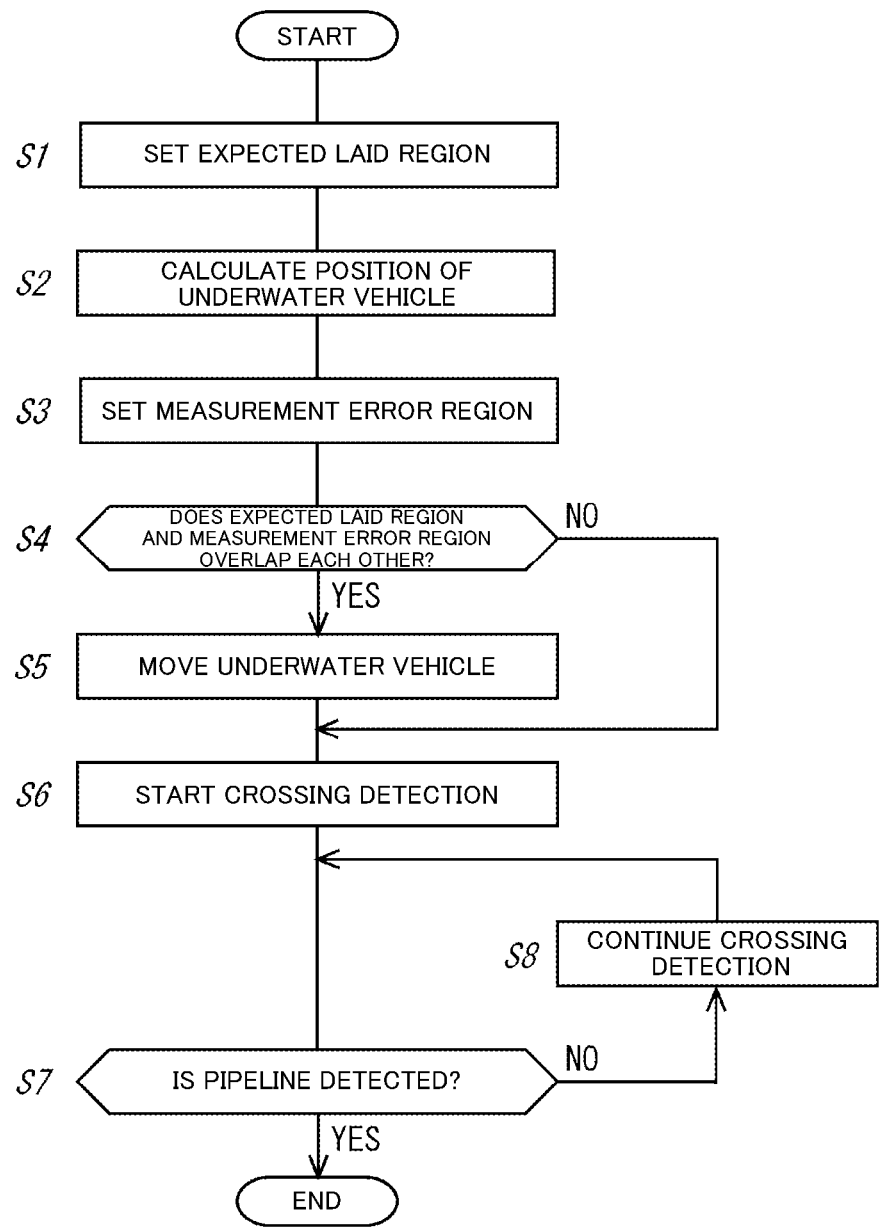
FIG. 2 is a flow chart of a searching program of Embodiment 1.

FIG. 2 is a flow chart of the searching program. The searching program shown in FIG. 2 is executed by the processing device 15 of the surface ship 10. The searching program is started when the underwater vehicle 20 reaches a predetermined height position from the bottom of the sea. When the searching program is started, the processing device 15 sets an expected laid region of the pipeline (Step S1). The "expected laid region" of the pipeline is a region where there is a possibility that the pipeline moves over time. The processing device 15 of the present embodiment stores a laid position at which the pipeline is laid first. The processing device 15 sets the expected laid region based on the stored laid position and an elapsed time since the pipeline is laid.

Figure 3:
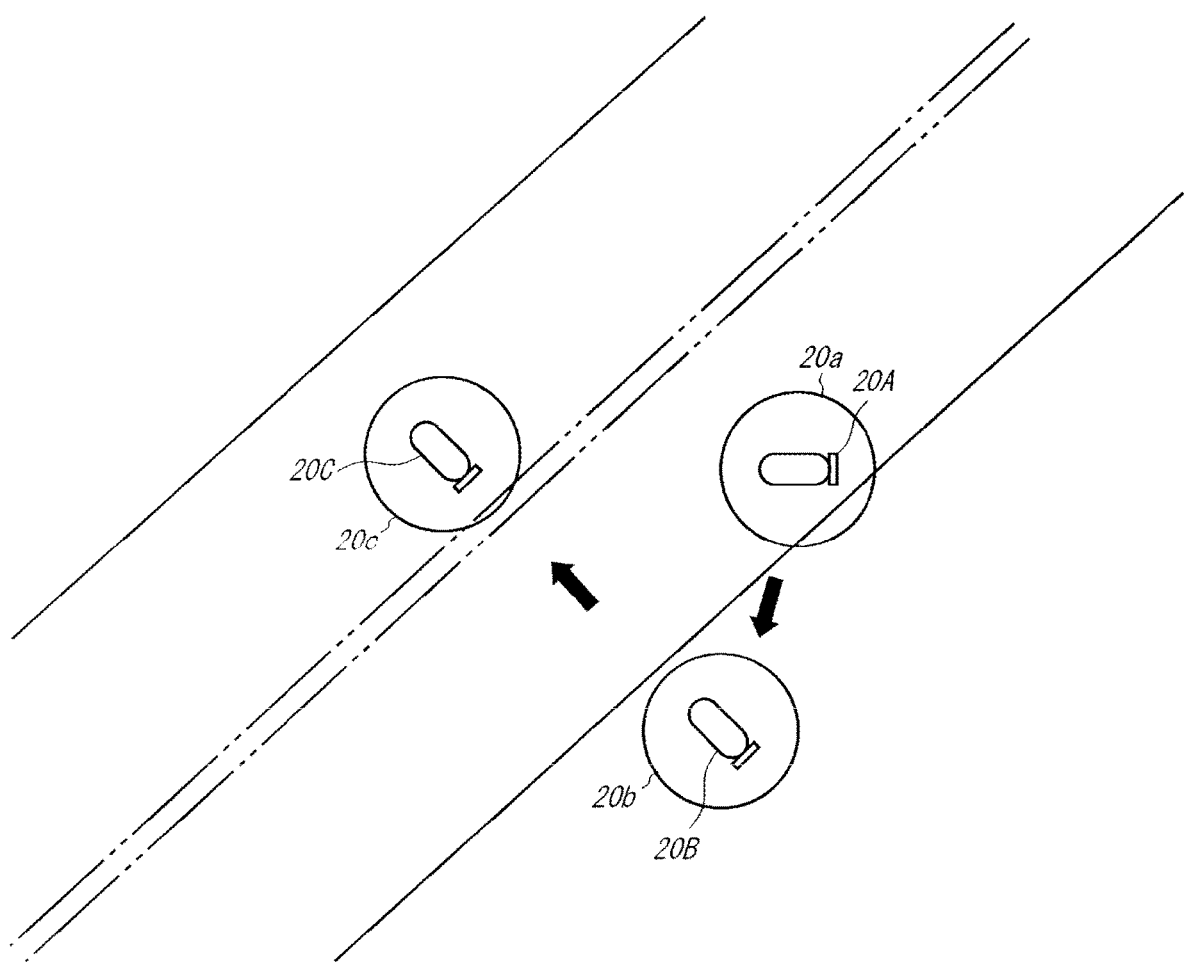
FIG. 3 is a diagram showing the operation of an underwater vehicle at the start of the search of Embodiment 1.

FIG. 3 is a diagram showing the operation of the underwater vehicle 20 in the searching work. In FIG. 3, two-dot chain lines show the laid position at which the pipeline is laid first, and a region between straight lines parallel to the two-dot chain lines shows the expected laid region of the pipeline. The expected laid region of the present embodiment has a band shape and extends linearly. In FIG. 3, the laid position at which the pipeline is laid first is located at the middle in the expected laid region. However, for example, when it is expected that the pipeline moves over time only in one direction, the laid position at which the pipeline is laid first deviates from the middle of the expected laid region.

Next, the processing device 15 calculates the position of the underwater vehicle 20 (Step S2). As described above, the processing device 15 can calculate the position (apparent absolute position) of the underwater vehicle 20 based on the positional information of the surface ship 10 acquired from the GPS device 12 and the relative position of the underwater vehicle 20 relative to the surface ship 10 acquired from the acoustic positioning device 41.

Next, the processing device 15 sets the measurement error region of the surface ship 10 (Step S3). As described above, since the measurement accuracy of the acoustic positioning device 41 is not high, a measurement error exists in the position of the underwater vehicle 20 calculated in Step S2. The "measurement error region" is a region where there is a possibility that the underwater vehicle 20 is located, i.e., a region whose center corresponds to the position of the underwater vehicle 20 calculated in Step S2. For example, in FIG. 3, when the position of the underwater vehicle shown by a reference sign 20A is the position of the underwater vehicle 20 calculated in Step S2, a region surrounded by a circle shown by a reference sign 20a is the measurement error region. The measurement error region expands as a distance between the surface ship 10 and the underwater vehicle 20 lengthens. The distance between the surface ship 10 and the underwater vehicle 20 can be estimated by the depth indicator 28.

Next, the processing device 15 determines whether or not the measurement error region of the surface ship 10 and the expected laid region of the pipeline overlap each other (Step S4). When it is determined that the measurement error region and the expected laid region overlap each other (Yes in Step S4), the processing device 15 moves the underwater vehicle 20 to such a position that the measurement error region and the expected laid region separate from each other (Step S5). For example, when the measurement error region and the expected laid region overlap each other as shown by the circle shown by the reference sign 20a in FIG. 3, the underwater vehicle 20 is moved to such a position that the measurement error region and the expected laid region do not overlap each other as shown by a circle shown by a reference sign 20b (see the underwater vehicle shown by a reference sign 20B in FIG. 3). After Step S5, below-described crossing detection is started (Step S6).

In contrast, when it is determined that the measurement error region and the expected laid region do not overlap each other (No in Step S4), the processing device 15 starts the crossing detection (Step S6). The "crossing detection" is work in which the underwater vehicle 20 detects the presence or absence of the pipeline while crossing the expected laid region. The presence or absence of the pipeline can be detected by using the target detector 22 of the underwater vehicle 20. When the underwater vehicle 20 crosses the expected laid region, for example, the position of the underwater vehicle 20 calculated by the processing device 15 moves from the position of the underwater vehicle shown by the reference sign 20B to the position of the underwater vehicle shown by a reference sign 20C.

Next, the processing device 15 determines whether or not the underwater vehicle 20 has detected the pipeline (Step S7). When it is determined that the underwater vehicle 20 has not detected the pipeline (No in Step S7), the crossing detection is continued (Step S8). The crossing detection is repeatedly performed until the pipeline is detected. In contrast, when it is determined that the underwater vehicle 20 has detected the pipeline (Yes in Step S7), the searching program is terminated, and the underwater vehicle 20 starts the next work, such as the inspection of the pipeline.

Operational Advantages, etc.

The foregoing has described the underwater work system 100 according to the present embodiment. The underwater work system 100 according to the present embodiment includes: the surface ship 10 located on the water; the underwater vehicle 20 that performs the searching work of finding the pipeline laid on the bottom of the water; the acoustic positioning system 40 that measures the relative position of the underwater vehicle 20 relative to the surface ship 10 by using the sound wave output from the acoustic positioning device 41 mounted on the surface ship 10; and the processing device 15. Then, the processing device 15 acquires the relative position of the underwater vehicle 20 relative to the surface ship 10 from the acoustic positioning system 40 at the start of the searching work. The processing device 15 calculates the position of the underwater vehicle 20 based on the acquired relative position. When the measurement error region whose center corresponds to the calculated position of the underwater vehicle 20 and the expected laid region of the pipeline extending in a predetermined direction overlap each other, the processing device 15 moves the underwater vehicle 20 to such a position that the measurement error region and the expected laid region do not overlap each other, and then, makes the underwater vehicle 20 perform the crossing detection in which the underwater vehicle 20 detects the presence or absence of the pipeline while crossing the expected laid region.

As above, since the underwater work system 100 according to the present embodiment performs the searching work of the pipeline in consideration of the measurement error of the acoustic positioning system 40 and the movement of the pipeline over time, the underwater work system 100 can basically find the pipeline by performing the crossing detection once. Therefore, the searching work of the pipeline can be efficiently performed.

Moreover, in the underwater work system 100 according to the present embodiment, the crossing detection is started from the position where the measurement error region and the expected laid region do not overlap each other. However, the crossing detection may be performed from a position where an interval between the measurement error region and the expected laid region is a predetermined distance. To be specific, the processing device 15 may acquire the relative position of the underwater vehicle 20 relative to the surface ship 10 from the acoustic positioning system 40 at the start of the searching work. The processing device 15 may calculate the position of the underwater vehicle 20 based on the acquired relative position. When the interval between the measurement error region whose center corresponds to the calculated position of the underwater vehicle 20 and the expected laid region of the pipeline extending in the predetermined direction is not the predetermined distance, the processing device 15 may move the underwater vehicle 20 to such a position that the interval between the measurement error region and the expected laid region becomes the predetermined distance, and then, may make the underwater vehicle 20 perform the crossing detection in which the underwater vehicle 20 detects the presence or absence of the pipeline while crossing the expected laid region.

According to this configuration, the pipeline can be found more surely than a case where the crossing detection is started from a position where the interval between the measurement error region and the expected laid region is shorter than the predetermined distance. Moreover, the amount of unnecessary work becomes smaller than a case where the crossing detection is started from a position where the interval between the measurement error region and the expected laid region is longer than the predetermined distance. Thus, the searching work can be efficiently performed.

Figure 4:
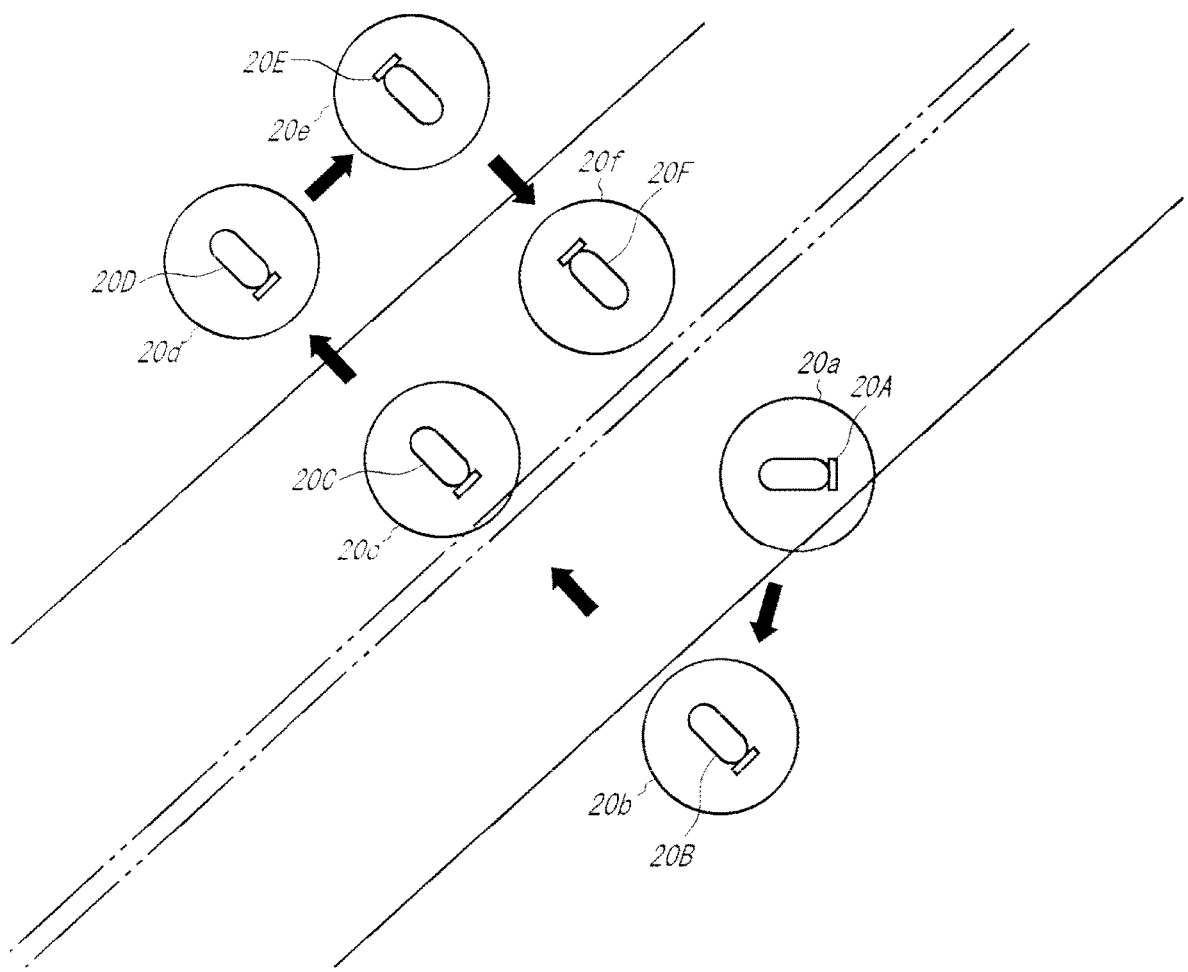
FIG. 4 is a diagram showing the operation of the underwater vehicle when a pipeline is not detected.

Moreover, the underwater work system 100 according to the above embodiment can basically find the pipeline by performing the crossing detection once. However, when the pipeline cannot be found by performing the crossing detection once, the crossing detection may be performed again. For example, as shown by a circle shown by a reference sign 20d in FIG. 4, when the underwater vehicle 20 cannot detect the pipeline although the underwater vehicle 20 passes through the expected laid region and moves to such a position that the measurement error region and the expected laid region do not overlap each other, a proceeding direction of the underwater vehicle 20 may be changed, and the crossing detection may be performed again (see the underwater vehicles shown by reference signs 20E and 20F in FIG. 4).

To be specific, in the searching work, the processing device 15 may acquire the relative position of the underwater vehicle 20 relative to the surface ship 10 from the acoustic positioning system 40 while making the underwater vehicle 20 perform the crossing detection in which the underwater vehicle 20 detects the pipeline while crossing the expected laid region of the pipeline extending in the predetermined direction. The processing device 15 may calculate the position of the underwater vehicle 20 based on the acquired relative position. When the pipeline is not detected although the underwater vehicle 20 moves to such a position that the measurement error region whose center corresponds to the calculated position of the underwater vehicle 20 and the expected laid region do not overlap each other, the processing device 15 may change the proceeding direction of the underwater vehicle 20 and may make the underwater vehicle 20 perform the crossing detection again.

According to this configuration, even when the pipeline is not detected by the crossing detection performed by the underwater vehicle 20, the crossing detection is performed again. Therefore, the pipeline can be found more surely. When changing the proceeding direction, a changed angle of the proceeding direction may be 180 degrees or may be an angle other than 180 degrees.

Embodiment 2

Figure 5:
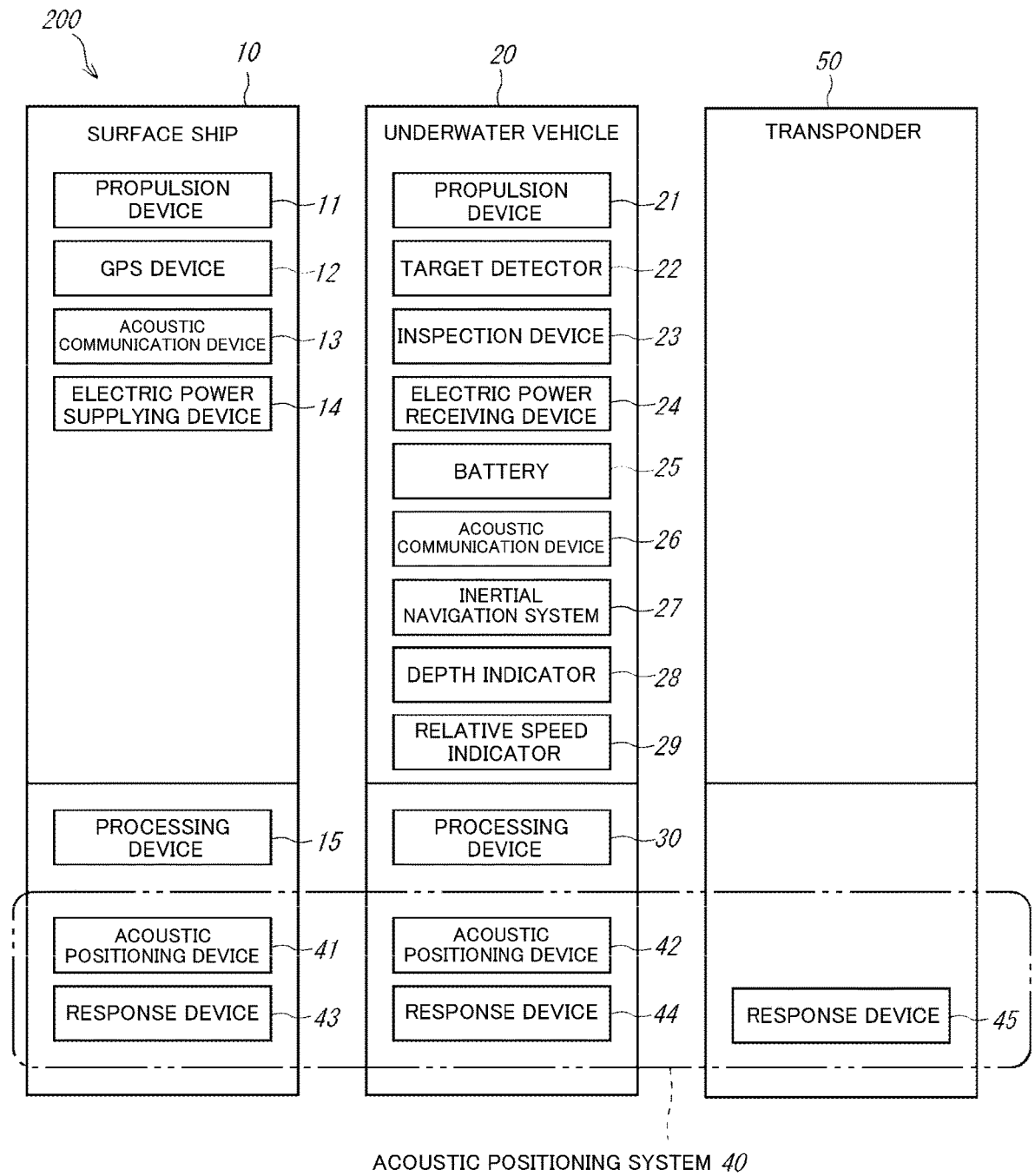
FIG. 5 is a block diagram of the underwater work system according to Embodiment 2.

Next, an underwater work system 200 according to Embodiment 2 of the present disclosure will be described. FIG. 5 is a block diagram of the underwater work system 200 according to the present embodiment. As shown in FIG. 5, the underwater work system 200 includes a transponder 50 in addition to the surface ship 10 and the underwater vehicle 20. Moreover, the acoustic positioning system 40 of Embodiment 2 includes a response device 45 in addition to the acoustic positioning devices 41 and 42 and the response devices 43 and 44. The response device 45 is disposed at the transponder 50.

Figure 6:
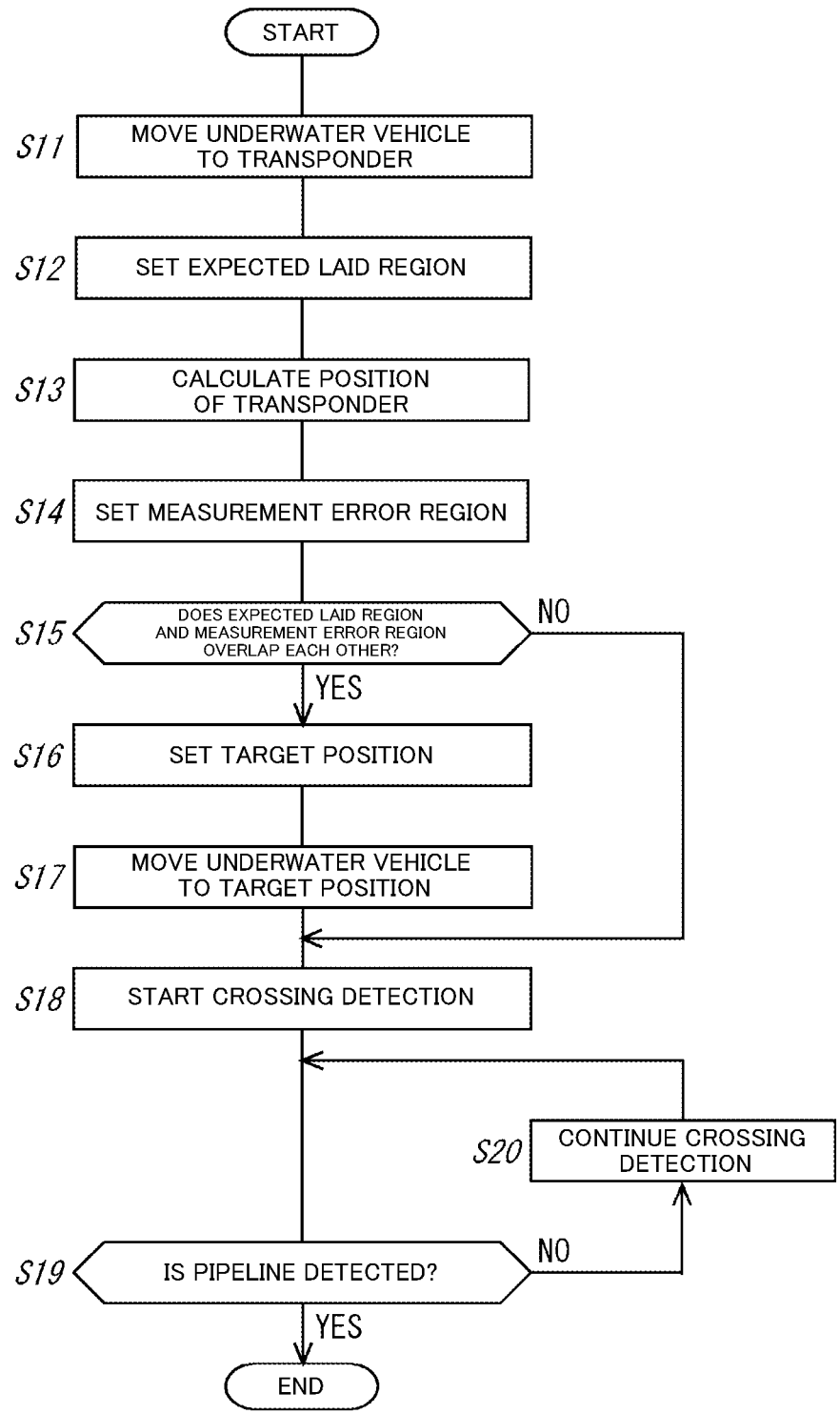
FIG. 6 is a flow chart of the searching program of Embodiment 2.

FIG. 6 is a flow chart of the searching program of Embodiment 2. The searching work of the present embodiment is performed based on the searching program. The searching program shown in FIG. 6 is executed by the processing device 15 of the surface ship 10. In the present embodiment, the transponder 50 is dropped from the surface ship 10 to the vicinity of the laid position at which the pipeline is laid first, and then, the searching program is started. A "weight" and a "float" may be disposed at the transponder 50 such that the height position of the transponder 50 from the bottom of the water becomes constant.

When the searching program is started, the processing device 15 moves the underwater vehicle 20 to the transponder 50 (Step S11). The movement of the underwater vehicle 20 is performed while measuring the relative position of the underwater vehicle 20 relative to the transponder 50 by using the acoustic positioning system 40. As the underwater vehicle 20 approaches the transponder 50, the measurement error by the acoustic positioning system 40 decreases. Therefore, the underwater vehicle 20 can accurately reach the transponder 50 (see the underwater vehicles shown by the reference signs 20A and 20B in FIG. 7 described below).

Figure 7:
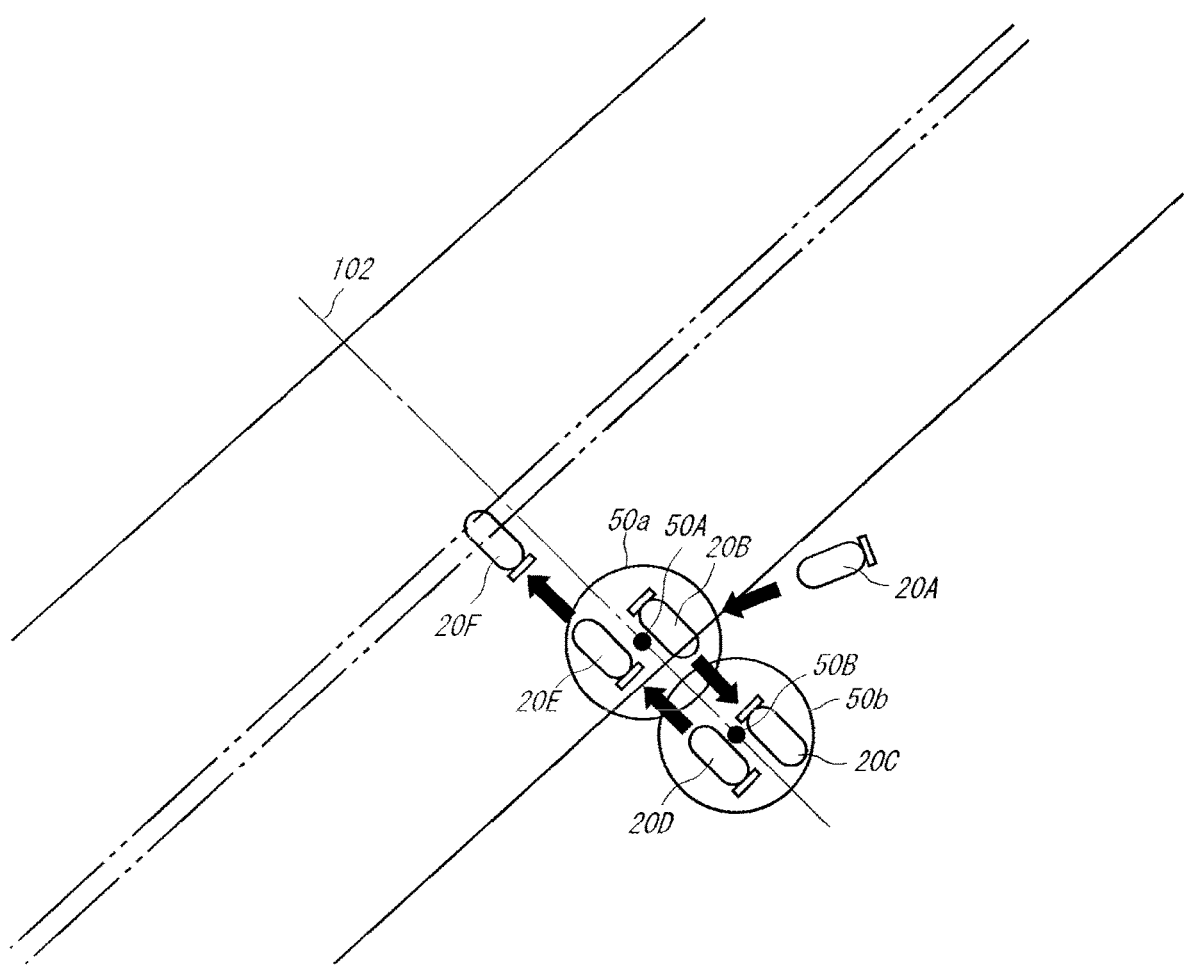
FIG. 7 is a diagram showing the operation of the underwater vehicle at the start of the search of Embodiment 2.

Next, the processing device 15 sets the expected laid region of the pipeline (Step S12). A method of setting the expected laid region of the pipeline is the same as Step S1 described above. FIG. 7 is a diagram showing the operation of the underwater vehicle 20 in the searching work of the present embodiment. As with FIG. 3, in FIG. 7, two-dot chain lines show the laid position at which the pipeline is laid first, and a region between straight lines parallel to the two-dot chain lines shows the expected laid region of the pipeline.

Next, the processing device 15 calculates the position of the transponder 50 (Step S13). The processing device 15 can calculate the position (apparent absolute position) of the transponder 50 based on the positional information of the surface ship 10 acquired from the GPS device 12 and the relative position of the transponder 50 relative to the surface ship 10 acquired from the acoustic positioning device 41.

Next, the processing device 15 sets the measurement error region of the transponder 50 (Step S14). The measurement error region is a region where there is a possibility that the transponder 50 is located, i.e., a region whose center corresponds to the position of the transponder 50 calculated in Step S13. For example, in FIG. 7, when the position of a point shown by a reference sign 50A is the position of the transponder 50 calculated in Step S13, a region surrounded by a circle shown by a reference sign 50a is the measurement error region. The measurement error region expands as a distance between the surface ship 10 and the transponder 50 lengthens. The distance between the surface ship 10 and the transponder 50 can be estimated by the depth indicator 28 of the underwater vehicle 20 located in the vicinity of the transponder 50.

Next, the processing device 15 determines whether or not the measurement error region of the transponder 50 and the expected laid region of the pipeline overlap each other (Step S15). When it is determined that the measurement error region and the expected laid region overlap each other (Yes in Step S15), the processing device 15 sets a target position (Step S16).

The "target position" is such a position of the transponder 50 that the measurement error region and the expected laid region do not overlap each other. To be specific, the target position is such a position of the transponder 50 that the measurement error region and the expected laid region do not overlap each other. Moreover, in the present embodiment, the processing device 15 sets the target position such that the target position is located on a virtual line that passes through the position of the transponder 50 calculated in Step S13 and is orthogonal to the expected laid region of the pipeline.

For example, if a circle shown by a reference sign 50b in FIG. 7 is the measurement error region, the measurement error region does not overlap the expected laid region, and therefore, a point shown by a reference sign 50B and located at the center of the circle shown by the reference sign 50b may be the target position. Moreover, if the position of the transponder 50 calculated in Step S13 is the point shown by the reference sign 50A, the point shown by the reference sign 50B is located on a virtual line 102 that passes through the reference sign 50A and is orthogonal to the expected laid region of the pipeline, and therefore, the point shown by the reference sign 50B may be the target position based on this condition.

After the processing device 15 sets the target position in Step S16, the processing device 15 moves the underwater vehicle 20 to the target position (Step S17; see the underwater vehicle shown by the reference sign 20C in FIG. 7). When moving the underwater vehicle 20 to the target position, the relative position of the underwater vehicle 20 relative to the transponder 50 is calculated based on the relative speed of the underwater vehicle 20 relative to the bottom of the water acquired from the relative speed indicator 29 of the underwater vehicle 20, and the underwater vehicle 20 is moved until the calculated position of the underwater vehicle 20 reaches the target position.

After the underwater vehicle 20 reaches the target position, the processing device 15 changes the proceeding direction and starts the crossing detection (Step S18; see the underwater vehicle shown by a reference sign 20D in FIG. 7). Moreover, when the processing device 15 determines in Step S15 that the expected laid region and the measurement error region do not overlap each other (No in Step S15), the processing device 15 starts the crossing detection (Step S18).

Next, the processing device 15 determines whether or not the underwater vehicle 20 has detected the pipeline (Step S19). When it is determined that the underwater vehicle 20 has not detected the pipeline (No in Step S19), the crossing detection is continued (Step S20; see the underwater vehicles shown by the reference signs 20E and 20F in FIG. 7). Step S20 is repeatedly performed until the pipeline is detected. In contrast, when it is determined that the underwater vehicle 20 has detected the pipeline (Yes in Step S19), the searching program is terminated, and the underwater vehicle 20 starts work, such as the inspection of the pipeline.

Operational Advantages, etc.

The foregoing has described the underwater work system 200 according to the present embodiment. The underwater work system 200 according to the present embodiment includes: the surface ship 10 located on the water; the transponder 50 dropped from the surface ship 10 to the bottom of the water; and the underwater vehicle 20 that performs the searching work of finding the pipeline laid on the bottom of the water based on the dropped transponder 50.

As above, the underwater work system 200 according to the present embodiment performs the searching work of the pipeline by using the transponder 50. When dropping the transponder 50, the transponder 50 is hardly influenced by tidal current as compared to the underwater vehicle 20. Therefore, the transponder 50 can be dropped closer to the position where the searching work of the pipeline is started, than the underwater vehicle 20. As a result, according to the present embodiment, the searching work of the pipeline can be efficiently performed.

Moreover, the underwater work system 200 according to the present embodiment further includes: the acoustic positioning system 40 that measures the relative position of the transponder 50 relative to the surface ship 10 by using the sound wave output from the acoustic positioning device 41 mounted on the surface ship 10; and the processing device 15. Furthermore, the underwater vehicle 20 includes the relative speed indicator 29 that can measure the relative speed of the underwater vehicle 20 relative to the bottom of the water. Then, the processing device 15 acquires the relative position of the transponder 50 relative to the surface ship 10 from the acoustic positioning system 40 at the start of the searching work. The processing device 15 calculates the position of the transponder 50 based on the acquired relative position. When the measurement error region whose center corresponds to the calculated dropped position of the transponder 50 and the expected laid region of the pipeline extending in a predetermined direction overlap each other, the processing device 15 sets, as the target position, such a provisional dropped position of the transponder 50 that the measurement error region and the expected laid region do not overlap each other. After the underwater vehicle 20 is moved to the dropped position of the transponder 50, the processing device 15 moves the underwater vehicle 20 until the position of the underwater vehicle 20 reaches the target position, while calculating the relative position of the underwater vehicle 20 relative to the transponder 50 based on the relative speed of the underwater vehicle 20 relative to the bottom of the water acquired from the relative speed indicator 29. The processing device 15 then makes the underwater vehicle 20 perform the crossing detection in which the underwater vehicle 20 detects the presence or absence of the pipeline while crossing the expected laid region.

As above, in the present embodiment, since the searching work of the pipeline is performed in consideration of the measurement error of the acoustic positioning system 40 and the movement of the pipeline over time, the pipeline can be basically found by performing the crossing detection once. Therefore, the searching work of the pipeline can be efficiently performed.

Moreover, in the underwater work system 200 according to the present embodiment, the processing device 15 sets the target position on a virtual line that passes through a dropped position of the transponder 50 measured at the start of the searching work and is orthogonal to the expected laid region of the pipeline.

Therefore, according to the present embodiment, a travel distance during the crossing detection can be reduced, and as a result, the searching work of the pipeline can be more efficiently performed.

Moreover, in the underwater work systems 100 and 200 according to Embodiments 1 and 2, when the pipeline is not detected even by performing the crossing detection once or plural times, the processing device 15 may move the underwater vehicle 20 along a direction in which the expected laid region of the pipeline extends, and then, may make the underwater vehicle 20 perform the crossing detection again.

According to this configuration, when the pipeline cannot be detected even by performing the crossing detection, the position where the crossing detection is performed is changed, and the crossing detection is performed again. Therefore, the pipeline can be found more surely.

Moreover, in the underwater work systems 100 and 200 according to Embodiments 1 and 2, when the pipeline is not detected even by performing the crossing detection once or plural times, the processing device 15 may lengthen the travel distance of the underwater vehicle 20 in the crossing detection and may make the underwater vehicle 20 perform the crossing detection again.

According to this configuration, when the pipeline cannot be detected even by performing the crossing detection, the travel distance during the crossing detection is lengthened, and the crossing detection is performed again. Therefore, the pipeline can be found more surely.

Moreover, in the underwater work systems 100 and 200 according to Embodiments 1 and 2, the operation program is executed by the processing device 15 disposed at the surface ship 10. However, the operation program may be executed by the processing device 30 disposed at the underwater vehicle 20, or the operation program may be executed by both of the processing devices 15 and 30.

From the foregoing description, numerous modifications and other embodiments of the present disclosure are obvious to those skilled in the art. Accordingly, the foregoing description is to be construed as illustrative only, and is provided for the purpose of teaching those skilled in the art the best mode for carrying out the present disclosure. The structural and/or functional details may be substantially modified without departing from the scope of the present disclosure.

What is claimed is:

1. An underwater work system comprising:
   a surface ship located on water;
   an underwater vehicle that performs searching work of finding a pipeline laid on a bottom of the water;
   a wave transmitter that is mounted on the surface ship and transmits a sound wave used to measure a relative position of the underwater vehicle relative to the surface ship; and
   circuitry configured to
      acquire the relative position of the underwater vehicle relative to the surface ship at the start of the searching work, the relative position being measured based on the sound wave transmitted from the wave transmitter,
      calculate a position of the underwater vehicle based on the acquired relative position, and
      when a measurement error region whose center corresponds to the calculated position of the underwater vehicle and an expected laid region of the pipeline extending in a predetermined direction overlap each other, move the underwater vehicle to such a position that the measurement error region and the expected laid region do not overlap each other, and then, make the underwater vehicle perform crossing detection in which the underwater vehicle detects the presence or absence of the pipeline while crossing the expected laid region.

2. An underwater work system comprising:
   a surface ship located on water;
   an underwater vehicle that performs searching work of finding a pipeline laid on a bottom of the water;
   a wave transmitter that is mounted on the surface ship and transmits a sound wave used to measure a relative position of the underwater vehicle relative to the surface ship; and
   circuitry configured to
      acquire the relative position of the underwater vehicle relative to the surface ship at the start of the searching work, the relative position being measured based on the sound wave transmitted from the wave transmitter,
      calculate a position of the underwater vehicle based on the acquired relative position, and
      when an interval between a measurement error region whose center corresponds to the calculated position of the underwater vehicle and an expected laid region of the pipeline extending in a predetermined direction is not a predetermined distance, move the underwater vehicle to such a position that the interval between the measurement error region and the expected laid region becomes the predetermined distance, and then, make the underwater vehicle perform crossing detection in which the underwater vehicle detects the presence or absence of the pipeline while crossing the expected laid region.

3. An underwater work system comprising:
   a surface ship located on water;
   an underwater vehicle that performs searching work of finding a pipeline laid on a bottom of the water;
   a wave transmitter that is mounted on the surface ship and transmits a sound wave used to measure a relative position of the underwater vehicle relative to the surface ship; and
   circuitry configured to
      in the searching work, acquire the relative position of the underwater vehicle relative to the surface ship while making the underwater vehicle perform crossing detection in which the underwater vehicle detects the pipeline while crossing an expected laid region of the pipeline extending in a predetermined direction, the relative position being measured based on the sound wave transmitted from the wave transmitter,
      calculate a position of the underwater vehicle based on the acquired relative position, and
      when the pipeline is not detected although the underwater vehicle moves to such a position that a measurement error region whose center corresponds to the calculated position of the underwater vehicle and the expected laid region do not overlap each other, change a proceeding direction of the underwater vehicle and make the underwater vehicle perform the crossing detection again.

4. An underwater work system comprising:
   a surface ship located on water;
   a transponder dropped from the surface ship to a bottom of the water; and
   an underwater vehicle that includes a relative speed indicator that measures a relative speed of the underwater vehicle relative to the bottom of the water, and performs searching work of finding a pipeline laid on the bottom of the water based on the dropped transponder;
   a wave transmitter that is mounted on the surface ship and transmits a sound wave used to measure a relative position of the transponder relative to the surface ship; and circuitry configured to acquire the relative position of the transponder relative to the surface ship at the start of the searching work, the relative position being measured based on the sound wave transmitted from the wave transmitter, calculate a position of the transponder based on the acquired relative position, when a measurement error region whose center corresponds to the calculated dropped position of the transponder and an expected laid region of the pipeline extending in a predetermined direction overlap each other, set, as a target position, such a provisional dropped position of the transponder that the measurement error region and the expected laid region do not overlap each other, after the underwater vehicle is moved to the dropped position of the transponder, move the underwater vehicle until the position of the underwater vehicle reaches the target position, while calculating a relative position of the underwater vehicle relative to the transponder based on the relative speed of the underwater vehicle relative to the bottom of the water acquired from the relative speed indicator, and then make the underwater vehicle perform crossing detection in which the underwater vehicle detects the presence or absence of the pipeline while crossing the expected laid region.

5. The underwater work system according to claim 4, wherein the circuitry sets the target position on a virtual line that passes through the dropped position of the transponder measured at the start of the searching work and is orthogonal to the expected laid region of the pipeline.

6. The underwater work system according to claim 1, wherein when the pipeline is not detected even by performing the crossing detection once or plural times, the circuitry moves the underwater vehicle along a direction in which the expected laid region of the pipeline extends, and then, makes the underwater vehicle perform the crossing detection again.

7. The underwater work system according to claim 1, wherein when the pipeline is not detected even by performing the crossing detection once or plural times, the circuitry lengthens a travel distance of the underwater vehicle in the crossing detection and makes the underwater vehicle perform the crossing detection again.

* * * * *